July 7, 1964

O. SCHUELLER 3,139,622

MOON CAPSULE SUIT

Filed April 17, 1961

INVENTOR.
OTTO SCHUELLER

BY *Wade Loontz*
ATTORNEY

*Arthur R. Parker*
AGENT

July 7, 1964  O. SCHUELLER  3,139,622
MOON CAPSULE SUIT
Filed April 17, 1961  4 Sheets-Sheet 3

INVENTOR.
OTTO SCHUELLER
BY
ATTORNEY
AGENT

July 7, 1964　　O. SCHUELLER　　3,139,622
MOON CAPSULE SUIT

Filed April 17, 1961　　4 Sheets-Sheet 4

INVENTOR.
OTTO SCHUELLER
BY
ATTORNEY
AGENT

United States Patent Office 3,139,622
Patented July 7, 1964

3,139,622
MOON CAPSULE SUIT
Otto Schueller, 1953 E. Bataan Drive, Dayton 20, Ohio, assignor to the United States of America as represented by the Secretary of the Air Force
Filed Apr. 17, 1961, Ser. No. 103,664
1 Claim. (Cl. 2—2)
(Granted under Title 35, U.S. Code (1952), sec. 266)

The invention described herein may be manufactured and used by or for the United States Government for governmental purposes without payment to me of any royalty thereon.

This invention relates generally to personnel protective equipment for use as an independent garment in outer space and, more particularly, to a space suit constituting an improvement over the Multi-Purpose Space Capsule described and claimed in my co-pending patent application Serial No. 97,116, filed March 20, 1961, now Patent No. 3,073,040.

Since the initial launching of a number of successful artificial satellites both into orbit and outer space, rapid progress has proceeded towards the investigation and analyzing of the basic requirements for sustaining human life in outer space. In regard thereto, the latter problem is most critical when considered in the light of prospective assigned missions involving a requirement that the future space man or astronaut exit from his transport vehicle for independent operation on the surface of the moon or other planet or, perhaps, on a space platform in orbit around the earth. In the light of these investigations, the basic life-supporting properties to be incorporated within a fully protected system for transporting the future astronaut into outer space and to the nearer planets have now been thoroughly analyzed and determined. Additionally, pay loads launched into orbit around the earth have increased from a few pounds to tons and the distances travelled into outer space have increased from a few hundred miles to virtually a million miles or more. Moreover, rocket engines generating a thrust of one and one-half million pounds will eventually become operational. Accordingly, it is now quite obvious that manned expeditions into outer space, both to the moon and the nearer planets will soon become a matter of record. Naturally, such an enterprise still involves the solution to a number of intricate problems, as for example, in the areas of guidance, landing and re-entry.

Another problem perhaps of even greater importance, involves the development of a "built-in" micro-environment in which is incorporated all of the basic life-supporting properties required for sustaining human life in outer space, in orbit and on the surface of the moon and the nearer planets. Of equal importance, perhaps, remains the problem of providing a relatively mobile space suit and/or garment which incorporates both the necessary life-supporting properties and facilitates ease of movement as well.

It is obvious, therefore, that manned expeditions to the moon, for example, will become a reality within the coming decades, if not sooner, and, accordingly, it is of the utmost importance that personnel protective equipment be developed enabling the space man to move around in the environment of outer space and perform useful work with relative ease and comfort for prolonged periods. The space suit and/or space capsule to be utilized for this purpose must incorporate a high factor of safety in order to ensure the success of the mission. In connection with the latter requirement, it is noted that conventional types of pressure suits in present use do not, in fact, afford the required safety factor. Moreover, with the normally utilized "full pressure suit" which, by definition, is a suit in which the wearer is entirely surrounded by a gas under a pressure equal to the pressure of the oxygen inhaled by the wearer, any damage or rupture thereof while operating in the environment of outer space, however slight and regardless of where located, effects a sudden loss of pressure or decompression throughout the entire suit, of course, resulting in fatal consequences within a very short period of elapsed time. The mechanical pressure suit may, of course, be substituted therefor since any damage or rupture of any portion thereof does not result in the decompression of the outer space suit mentioned above; however, such mechanical pressure suits also have the inherent disadvantages of relative lack of comfort and immobility, the latter especially when said suit is inflated. Under such circumstances, the inflated mechanical pressure suit is normally restricted in use to the complex missions of relative short duration. With the moon capsule suit of the present invention, the inherent disadvantages of lack of comfort and relative immobility have been substantially improved.

In connection with the inventive moon capsule suit, it is noted that it is designed to operate on the moon where the gravitational force is approximately ⅙ of that on earth and, accordingly, an assembly weighing 200 lbs. on earth, for example, would have the apparent advantage of actually weighing only approximately 33 lbs. on the moon. On the other hand, an assembly of relatively heavy weight would effect a twofold purpose on the moon, i.e., greater stability in ordinary movements and because of the aforesaid difference in gravity, movements would appear similar to those on earth. Of course, increasing the relative mass of an assembly would also result in substantially increased weight added to the transport vehicle, in turn, effecting increased fuel consumption and decreased vehicle performance. The latter two characteristics are naturally very undesirable and, of course, should be eliminated or substantially reduced if more successful space flights are to be possible. The above-mentioned increase in weight followed by a corresponding reduction in overall vehicle performance is greatly emphasized in the case of the entire pressurized cabin and/or compartment. With the moon capsule suit of the instant invention, such prohibitive increase in overall weight is substantially reduced to a more practicable, less costly weight in a manner to be hereinafter described in detail with reference to the device of the instant invention.

In order to perform certain essential and desirable missions in outer space and on the planet to be explored, as for example, the assembly of space stations and platforms, unloading supply ferries, repair and maintenance work on space stations, and the construction of shelters and observatories, it will be frequently necessary for the future astronaut to leave his main transport vehicle and operate relatively independent thereof for both short and prolonged periods of time. Furthermore, during operation outside the space vehicle on a space platform or during exploration of the moon, for example, the space man will be subjected to irradiation from the sun of approximately 50% higher than that falling on the surface of the earth on a summer day with the sun directly overhead. Thus, during the lunar day (lasting approximately 14 earth days) the surface of the moon is heated to approximately 130° C. or 266° F., whereas during the lunar night (lasting also approximately 14 earth days), the surface of the moon radiates to a black sky of a temperature of approximately absolute zero degrees and the temperature thereon drops to approximately −150° C. or −238° F. Such a temperature difference of approximately 280° C. between night and day on the surface of the moon places emphasis on two major problems, namely, protection from both extremes of pressure and heat. Man requires pressure in his environment primarily to support inspiration and thus supply life-giving oxygen to his system for oxygenation of the blood. Adequate oxygenation of the blood necessitates a minimum pressure of approximately 140 mm. Hg, while breathing pure oxygen, to support the requisite inspiration. This minimum pressure of 140 mm. Hg constitutes the internal lung pressure which, in turn, also governs the external pressure to be utilized therewith since any pressure differential, especially in the area across the chest is poorly tolerated. Said counteracting external pressure may be supplied either by surrounding or immersing the entire body within a compartment of gas or liquid under a pressure equal to the air pressure in his lungs or, alternatively, by utilizing a mechanical pressure suit for applying mechanical pressure directly to the skin equal to the air pressure within the lungs. This later method proves feasible since the human male consists of approximately 60% water and pressure in his lungs is transmitted uniformly by body fluids throughout his entire body. Of course, for maximum comfort, the use of standard pressures and atmospheres are indicated for the least complications in man; however, past experiences from the study of high altitude flights and the habitat of mountain dwellers indicates a wide tolerance and adaptability of man to lower atmospheric pressures and to pressure changes. In connection with the latter, a mixture of oxygen and nitrogen is considered more desirable from a safety standpoint but effects a higher total pressure. In any event, the outside limit of tolerability appears to be that point beyond which the "bends" or decompression sickness occurs. In connection therewith, it has been found that no bends problem exists up to an altitude of 20,000 feet or above a pressure of approximately 350 mm. Hg. Between 350 mm. Hg and 260 mm. Hg (corresponding to an altitude of 27,000 feet), a small incidence of the bends occurs; however, at pressures below 260 mm. Hg the problem of the bends progressively increases. Even so, the bends can be virtually eliminated at altitudes up to 40,000 feet or 140 mm. Hg pressure by means of prebreathing of pure oxygen for varying periods to thereby eliminate the nitrogen in the blood. The latter altitude and pressure represents the final physiological boundary beyond which man cannot go without suffering fatal consequences. It will be hereinafter seen, therefore, that the future astronaut or space man may perform useful missions in the arrangement of the present invention while operating outside of his main transport vehicle and "wearing" a substantially portable space suit affording protection against the conditions of outer space and operating with relative mobility and comfort.

It is an object of the present invention, therefore, to provide a space suit arrangement including a mechanical pressure suit combined with a pressurized protective shell to facilitate greater safety and comfort.

It is a further object of the invention to utilize a combined space suit and pressurized shell equipped with improved means for facilitating independent movement in outer space.

It is a still further object of the invention to have a moon capsule suit incorporating flexible arm and leg portions extending outside of the capsule for facilitating movements and enhancing a relative mobility thereof to perform useful work.

Another object of the invention resides in a pressurized capsule device providing walking space therein for facilitating movement of the leg portion associated therewith.

Other objects and advantages of the invention will become apparent from the following description, taken in connection with the accompanying drawings, in which like reference characters refer to like parts in the several figures.

FIG. 1a is a sectional view of the joint showing the manner in which the umbrella is adjustable.

FIG. 1b is a sectional view illustrating the manner in which the radiator blinds are manually adjustable.

Figure 1:
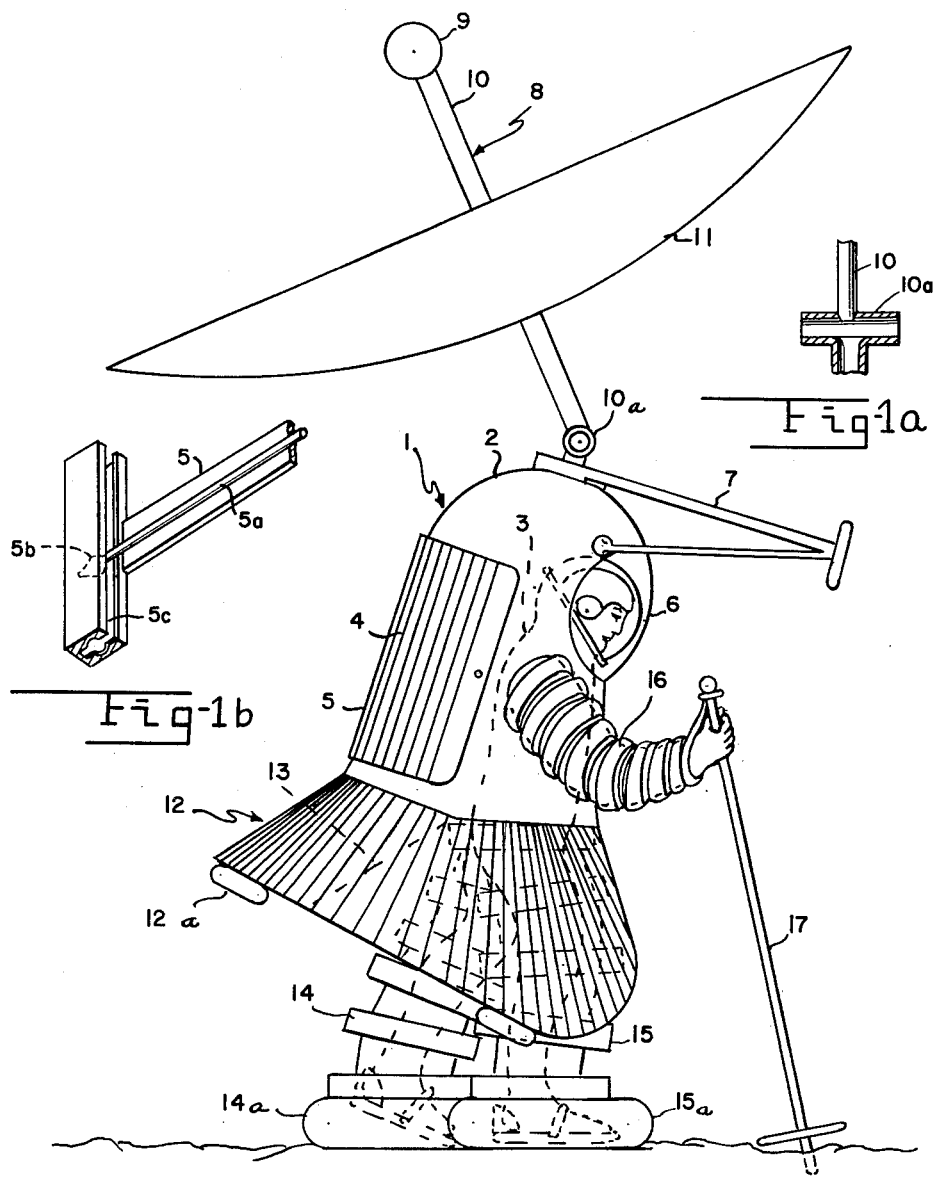
FIG. 1 is a somewhat schematic, side view of the moon capsule of the instant invention, illustrating a space man enclosed therein in walking position.

Referring to the drawings and particularly to FIG. 1 thereof, the moon capsule suit of the instant invention is indicated generally at 1 as including a pressurized capsule 2 and an emergency mechanical pressure suit 3 in which is enclosed the prospective space man. Said pressurized capsule 2 incorporates a door indicated at 4 as including a plurality of radiator blinds 5 adaptable to be manually adjusted when desired and an observation window 6. The radiator blinds 5 are attached to a shaft 5a which terminates with an enlargement 5b. The capsule 2 has a track 5c conforming in shape to the terminal portion of rod 5b which permits manual adjustment of the blinds 5. A relatively elongated upper support element 7 is rigidly affixed to capsule 2 adjacent the upper end thereof for a purpose to be hereinafter set forth. Also, positioned on said capsule 2 adjacent the upper end thereof and extending upwardly therefrom may be a combined solar power source and umbrella indicated generally and only schematically at 8 which combined solar power source and umbrella 8 consists, in general, of a concentrator device 9 mounted on the upper end of a relatively elongated support 10 which support 10 is pivotally positioned as at 10a on space capsule 2 as shown in greater detail in FIG. 1a. The pivotal joint consists of a T-shaped split collar 10a supported on base member 7 by the vertically extending leg of the T-shaped member. The support member 10 terminates in a horizontally disposed member adapted to be supported at each end in the split collar 10a. There is a tight fit between the collar and horizontally disposed member so that manual movement of support 10 is permitted and will be held in the adjusted position. The support 10 may also double as a communication antenna. An umbrella indicated also schematically at 11 is combined therewith for giving further protection to the space man. The umbrella is concaved and has a reflective surface which is faced in the direction of the sun by adjustment of support 10 so that the umbrella can reflect the radiation from the sun away from the capsule and occupant thereof onto the concentrator device 9. The concentrator device is a well known device which converts light energy into electrical energy which is transmitted into the capsule to be stored and subsequently used as the need arises. The major source of need of the electrical energy stored is to heat the capsule during the lunar night. The aforesaid combined solar power source and umbrella is not illustrated in more than schematic form since the specific details thereof are unimportant to the present invention; however, the sun's rays are, of course, reflected thereby onto the concentrator device 9. Integrally formed with said pressurized capsule 2 and extending in depending relation therefrom is an outwardly flared protective shield indicated generally at 12 as incorporating a plurality of radiator blinds 13, similar to the previously-described radiator blinds 5 incorporated on door 4 for controlling the effect of solar radiation thereon.

The above-described pressurized capsule 2 also incorporates as a key feature thereof a pair of extensible leg sections indicated at 14 and 15 which extend downwardly from capsule 2 and are integrally formed therewith for accommodating therein the legs of the space man housed therein and thereby providing for upright support of space capsule 2. As clearly illustrated in FIG. 1 of the drawings, the protective shield 12 is made outwardly flared relative to the bottom outer periphery of capsule 2 in order to provide for a relatively large amount of walking space for movement of extensible leg sections 14, 15. In addition, the rear portion of protective shield 12 is provided with an enlarged depending surface 12a providing support for said capsule 2 and the space man enclosed therein when the latter is in the sitting or rest position of FIG. 2. Moreover, extensible leg sections 14, 15 are equipped with greatly enlarged foot portions 14a, 15a which act as dust skis for facilitating movement on the surface of the moon. Space capsule 2 is also equipped with a pair of extensible arm sections, one of which is illustrated schematically at 16 which arm sections may be made identical to those disclosed in my copending patent application, Serial No. 97,116, filed March 20, 1961. A probe stick or pole indicated at 17 may also be utilized by the prospective space man for balance purposes.

Figure 2:
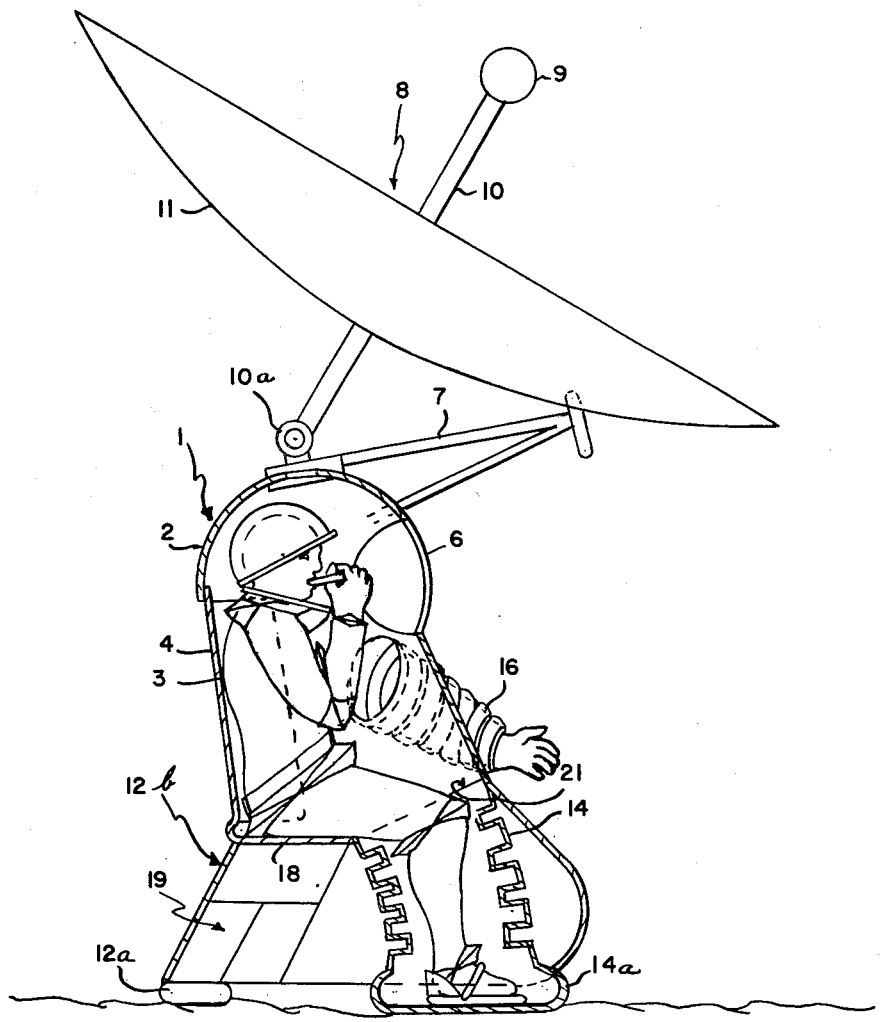
FIG. 2 is another somewhat schematic, cross-sectional view, taken about on line 2—2 of FIG. 4, illustrating additional details of the moon capsule suit of FIG. 1 with the space man added thereto and illustrated in a position of rest.

With specific reference to FIG. 2 of the drawings, the space capsule 1, 2 of the instant invention and the space man enclosed therein are shown in a sitting or rest position wherein the rear portion of the aforesaid protective shield 12 as indicated generally at 12b acts as the main support for the seat indicated at 18 on which the space man is resting while, for example, partaking of food and/or drink. Said rear portion 12b, of course, rests on the previously-mentioned enlarged depending surface 12a. Also the rear portion 12b of protective shield 12 is outwardly flared relative to space capsule 2 to provide space for storage of boxes for food and water and other items as indicated schematically at 19, in addition to providing "leg-room" as hereinbefore mentioned.

Figure 3:
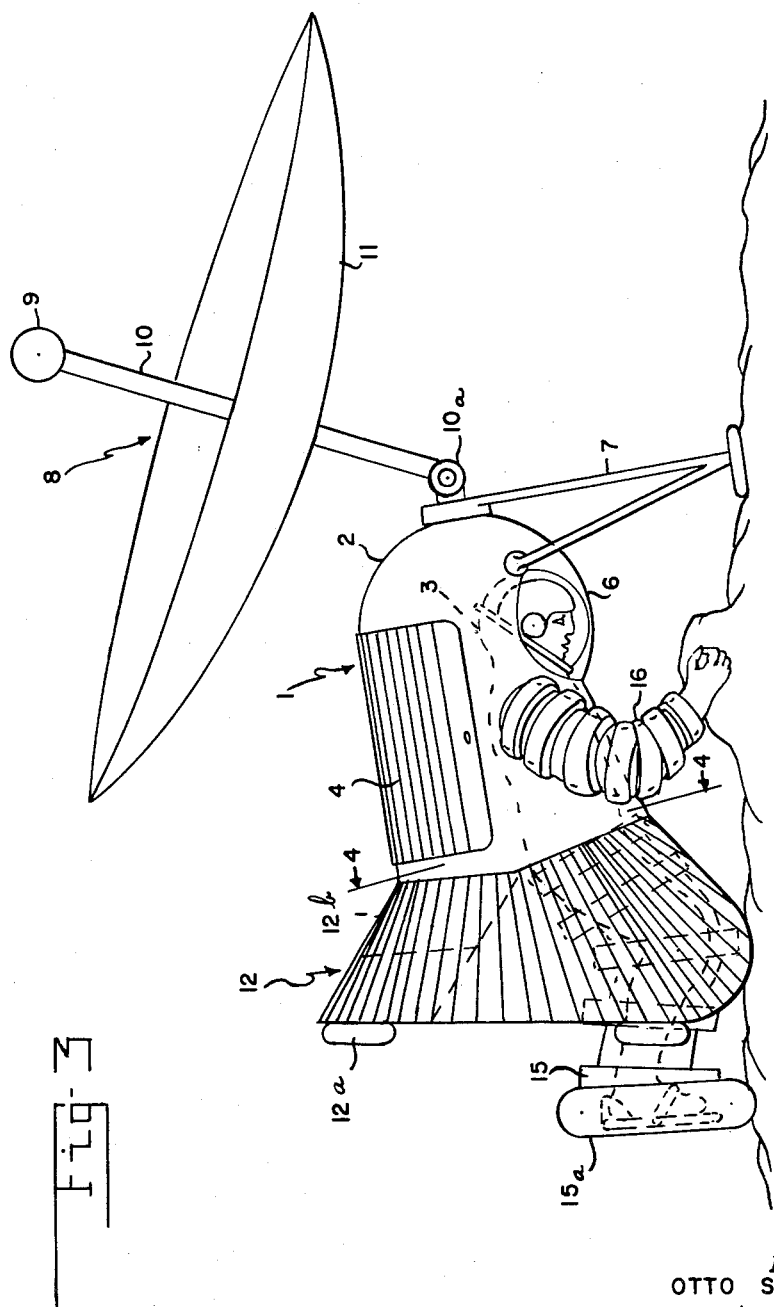
FIG. 3 is another view similar to FIG. 1, illustrating the inventive moon capsule suit with the space man enclosed therein in a substantially kneeling position investigating the ground.
Figure 4:
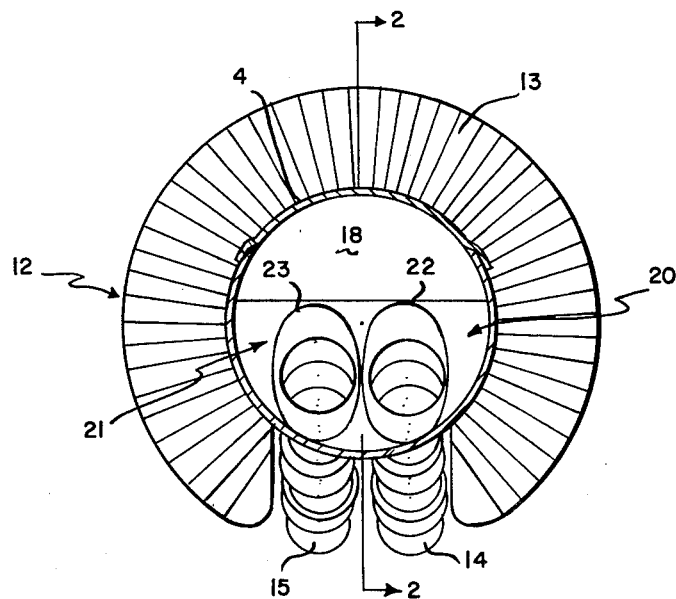
FIG. 4 is still another somewhat schematic, cross-sectional view, taken about on line 4—4 of FIG. 3, illustrating details of the leg sections and walking space provided therefor outside the protective shield of the moon capsule suit of the invention.

In FIG. 3 of the drawings, the space man inclosed within the inventive space capsule 2 is shown in a kneeling position investigating the ground which may represent the surface of the moon, for example, the latter clearly emphasizing the improved mobility of the moon capsule suit 1 of the present invention. The elongated upper support 7 now provides a support for the upper portion of the moon capsule suit 1 by resting on the ground. As seen in the detailed illustration of FIG. 4 of the drawings, the bottom surface of space capsule 2 indicated generally at 20 includes the previously-mentioned seat 18, which is in its normal, horizontal position when the space man is in the seated position, and a front portion 21 extending upwardly at an angle to said seat 18 (note FIG. 2). In said front portion 21 are incorporated a pair of relatively elongated, adjacently positioned oval-shaped openings indicated generally at 22 and 23 which openings 22, 23 are in respective communication with the interior of leg sections 14, 15 and are enlarged to accommodate the legs of the space man housed in space capsule 2. Said leg openings 22, 23 are made oval-shaped and large enough to provide considerable walking space and leg room within the circumference of said protective shield 12 as is illustrated from the standing position of FIG. 1, the sitting position of FIG. 2 and the kneeling position of FIG. 3, as hereinbefore described.

It is seen, therefore, that in the combination mechanical pressure, emergency suit 3 and space capsule 2 (constituting the moon capsule suit 1 of the instant invention), a considerable safety factor is ensured. Further, considerably higher comfort is also provided, since so long as the capsule is pressurized, the mechanical pressure suit is not stressed. In the event of any failure or damage occurring to the aforesaid space capsule 2, the mechanical pressure suit 3 worn by the space man is designed to inflate automatically. In either event, space capsule 2 will still provide considerable protection against heat irradiation or heat loss as well as assure considerable protection against impact from meteorites and the like. Of course, the radiator blinds 5 and/or 13 are very simple to operate and may be operated manually as desired. Naturally, since the space capsule 1 of the present invention is equipped with extensible, pressure-compensated arm and leg sections (as hereinbefore described), the inventive moon capsule suit 1 is relatively comfortable and mobile to enable exploration and the performance of useful work for prolonged periods. Moreover, the space man may leave space capsule 2 through door 4 for short periods of time when necessary.

An important advantage of the mechanical pressure suit, other than those advantages already listed, is that they need not be airtight and, additionally, an air conditioning system is not necessarily needed under all conditions since the simple evaporative cooling mechanism of the body itself may be utilized for this purpose to good advantage. In connection therewith, it is noted that there are four basic ways in which heat exchange between the human body and its surroundings may be accomplished. These are conduction, convection, radiation and evaporation of water from the lungs and skin. Conduction accounts for only a negligible amount of heat exchange, as for example, that occurring through contact of the shoes with the surface of the moon. Of course, such heat exchange through conduction would not be negligible where the space man is immersed in water to increase his tolerance to high gravity forces occurring during launching and re-entry. On the other hand, the heat exchange resulting from convection is far more important and, as such, constitutes one of the main cooling factors in the ventilation garments incorporated in full pressure suits and in pressurized compartments. This convection effect is proportional to the temperature difference between the body surface and the surrounding air. In moving air, this effect increases approximately with the square root of the air speed; however, convective cooling becomes ineffective when air temperatures approach the normal skin temperature of the human body of approximately 35° C. or 95° F. In regard to heat transfer or exchange through radiation, it has been found that the human skin behaves like a perfect "black body" when subjected to long wave infrared radiation and, accordingly, exchanges heat with its surroundings, as for example walls, at a rate proportional to the difference between the fourth powers of their absolute temperatures. However, the cooling effect of radiation is reduced to zero at surrounding wall temperatures of approximately 35° C. or 95° F. which represents the normal skin temperature of the human body.

In addition to the above-described methods of heat exchange, evaporation accounts for a rapidly increasing proportion of heat loss as the temperature of the surrounding environment approaches that of the human skin. Coincidentally therewith, the amount of heat available for loss by convection and radiation becomes increasingly smaller. Thus, at air temperatures at and above 35° C. or 95° F., virtually all of the heat loss of the body results from evaporation and the rate of evaporation of the body's perspiration is proportional to the difference in vapor pressure on the human skin and of the surrounding air. It also depends on the rate of movement of such air. Thus, cooling effect by evaporation increases markedly at lower air pressures. For example, the same mass of dry air at a pressure of 260 mm. Hg can absorb approximately three times more water vapor and remove, within the comfort range, approximately twice as much heat as at 760 mm. Hg. Therefore, evaporative cooling would be most effective in a vacuum. Of course, no cooling effect occurs where the air is already saturated with moisture, in which event, the perspiration runs off without evaporation. A man can stand temperatures up to 120° C. or 248° F. for a short period provided the air is dry. A temperature of 35° C. or 95° F. may prove fatal within a matter of hours should the air already be saturated with moisture. As an example, to lower the body temperature of an average man weighing 70 kg. or 154 lbs. by 1° C. requires the evaporation of approximately 0.12 kg. or 0.264 lb. of perspiration. By comparison, 290 kg. or 638 lbs. of air would have to be heated 1° C. to remove the same amount of heat. Thus, it is clear that the cooling effect by evaporation of water from the lungs and skin is substantial and remains the only physical principle available for survival of man at surrounding temperatures above 35° C. or 95° F. during extended periods of exposure.

In view of the above considerations, from the biomedical viewpoint, it is desirable, if not essential, that temperatures within personnel protective assemblies, as the moon capsule suit of the present invention, be maintained within the comfort range to permit maximum work performance. At this temperature range, the mean skin temperature of the space man clothed in the mechanical pressure, emergency mechanical suit 3 would vary between 30–35° C. or 86–95° F. Recent air conditioning studies discloses that the sedentary or slightly active man is comfortable when the surrounding air is at a dry-bulb temperature of 23–25° C. and a relative humidity of 25–60%. Thus, with the inventive moon capsule suit 1, no air conditioning system is normally required for utilization thereof since the simple evaporative cooling mechanism "built-in" the body of the space man may be used as previously described for this purpose.

Thus, a new and improved moon capsule suit has been developed by the present invention wherein greater comfort and relative mobility have been facilitated. Moreover, the highest possible safety factor has been incorporated within the moon capsule suit of the instant invention through utilizing the inventive space capsule (as at 2 in FIG. 1 of the drawings) in combination with a mechanical pressure, emergency suit as at 3. The latter is not utilized normally until and if a decompression of the capsule occurs. Furthermore, heat control is maintained within required limits by natural evaporation of water from the lungs and the skin. A key feature of the inventive moon capsule suit resides in the provision of extensible, pressure-compensated leg (14, 15) and arm sections (note 16 in FIG. 1) for ensuring the necessary mobility for the performance of assigned missions requiring as near normal arm and leg movements as possible.

An important consideration in connection with the moon capsule suit 1 of the subject invention is the proposition that heat exchange between the inventive protective assembly and the surrounding space environment is, in general, effected primarily by radiation; however, the heat output of the average space man may, of course, vary considerably depending on the amount of work engaged in and on the amount of emotional stress present and is, therefore, substantially unpredictable. Accordingly, the emissive, absorptive or reflective surface properties of either the moon capsule 2 or space suit 3 of the invention are made adjustable in different spectral regions, for example, by means of the previously-described radiator blinds 5, 13.

I claim:

A self-sufficient, life-support system including a moon capsule suit comprising a pressure capsule adapted to house a prospective space man therein in an emergency mechanical pressure suit, said capsule incorporating extensible arm sections exteriorly thereof, a pair of extensible leg sections adapted to accommodate the legs of the space man loosely therein and extending in depending relation from said pressurized capsule in open communication with the interior of said pressurized capsule, and combined solar radiation protection and power source means provided on said capsule insuring protection of the space man from solar radiation comprising an umbrella element pivotally mounted over said capsule and concave in the direction to face the sun, the umbrella having a reflective surface adapted to reflect the radiation from the sun onto a concentrator element, said combined radiation protection means further comprising a protective radiation shield affixed in depending relation to said pressurized capsule in partial surrounding relation to said pair of extensible leg sections in spaced relation thereto.

References Cited in the file of this patent

UNITED STATES PATENTS

| | | |
|---|---|---|
| 297,647 | Tuck | Apr. 29, 1884 |
| 735,809 | Petrie et al. | Aug. 11, 1903 |
| 2,061,256 | Romano | Nov. 17, 1936 |
| 2,954,562 | Krupp | Oct. 4, 1960 |

FOREIGN PATENTS

| | | |
|---|---|---|
| 115,438 | Great Britain | Jan. 29, 1920 |